March 1, 1938. T. V. BUCKWALTER 2,110,104
LOCOMOTIVE CROSSHEAD SAFETY CONSTRUCTION
Filed Sept. 7, 1937
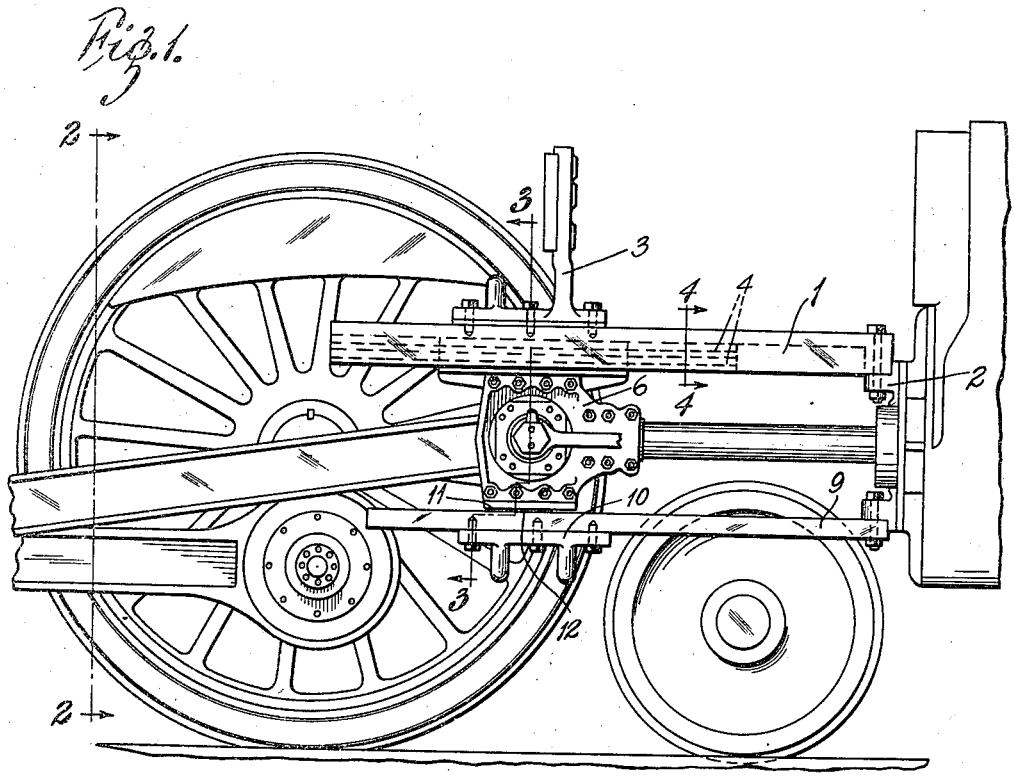
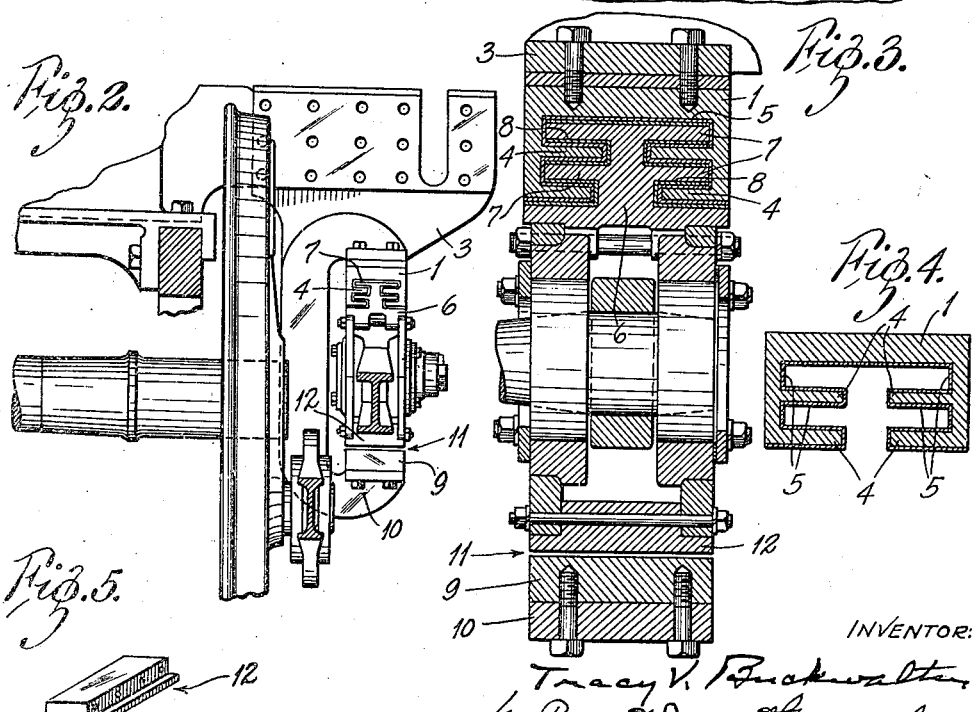
INVENTOR:
Tracy V. Buckwalter
HIS ATTORNEYS Patented Mar. 1, 1938

2,110,104

UNITED STATES PATENT OFFICE 2,110,104

LOCOMOTIVE CROSSHEAD SAFETY CONSTRUCTION

Tracy V. Buckwalter, Canton, Ohio, assignor to The Timken Roller Bearing Company, Canton, Ohio, a corporation of Ohio Application September 7, 1937, Serial No. 162,671

2 Claims. (Cl. 105—37)

This invention relates to locomotive crossheads of the type which are suspended from horizontal guideways provided therefor on the locomotive. In such constructions, the guides are usually provided with shoes or rubbing pieces to serve as bearing surfaces for the crosshead, and the crosshead is usually provided with liners of soft bearing metal cast on the bearing surfaces thereof. In practice, such crosshead shoes and liners wear and are liable to break and be thrown off, with the result that the crosshead becomes temporarily inoperative until refitted with shoes and liners. If such an accident happened while the locomotive was on a run, another locomotive would have to be sent for, to haul it into the shop for repair. The object of the present invention is to enable the locomotive to remain operative even though its crosshead shoes and liners may break or be thrown entirely off. The invention consists principally in providing an emergency guide for the bottom of the crosshead, such emergency guide being normally clear of the crosshead by a distance which is less than the thickness of the shoes or liners.

In the accompanying drawing, wherein like reference numerals refer to like parts wherever they occur, Fig. 1 is a side elevation of a crosshead construction embodying my invention, Fig. 2 is a vertical cross-section on the line 2—2 of Fig. 1, looking to the right, Fig. 3 is an enlarged vertical cross-section through the guideway construction on the line 3—3 of Fig. 1, looking to the left, Fig. 4 is a vertical sectional view of the main guide member; and Fig. 5 is a perspective view of the bottom member of the crosshead.

The crosshead construction illustrated in the accompanying drawing is of the familiar multiple guide type. In this construction, the main guide member 1 is substantially horizontal or parallel with and above the extended axis of the locomotive cylinder. The front end of the guide member is mounted on the cylinder head 2; and the back portion thereof is mounted on a bracket 3 which is secured to the frame of the locomotive. This main guide member 1 is of inverted U-shape in cross-section and has two ribs 4 projecting from each inner side wall, thus forming guideways. These ribs have shoes 5 in the form of flat liners or rubbing pieces made of brass or other suitable bearing material applied to or cast on the tops, bottoms and inner ends thereof and thus form guideways in which the upper portion of the crosshead 6 has a sliding fit. The upper portion of the crosshead comprises laterally extending ribs 7 provided with a lining 8 of soft bearing metal preferably cast on the tops and bottoms and inner ends of the spaces between said ribs. The matching parts are of such dimensions that, when new, the crosshead member has a nice sliding fit in the guide member.

According to the present invention, an emergency guide member 9 is located below the bottom of the crosshead with its upper surface parallel with the guideways in the main guide member. This emergency guide member has its front end fixed to the cylinder head 2 and its back portion is fixed to a bracket 10 which preferably forms part of or depends from the bracket which supports the main guide member. The emergency guide is so located that, so long as the shoes and liners are of full thickness and properly positioned, there will be a clearance space 11 between the bottom 12 of the crosshead and the top of the emergency guide, but this clearance space is less than the thickness of either of the shoes or liners. Thus, so long as the crosshead is unimpaired and its shoes and liners are of adequate thickness and in good condition, the construction operates like the familiar multiple guide crosshead; but when the shoes or liners are lost or become excessively worn, the crosshead becomes lower and lower until its bottom reaches the upper surface of the emergency guide, whereupon it travels on said emergency guide. Thus, the locomotive is enabled to proceed to its destination without delaying for repairs.

What I claim is:

1. In a locomotive construction, the combination of a guide for the upper portion of a crosshead, a crosshead whose upper portion is supported by and has a sliding fit in said guide, and a second guide below the bottom of said crosshead and normally spaced slightly therefrom whereby said crosshead normally runs clear of said second guide but runs thereon in case of breakage or excessive wear of the first guide.

2. In a locomotive construction, the combination of a guide having shoes on its guideways, a crosshead whose upper portion is fitted in and normally supported by said guide and comprises linings on its guideway fitting portions, and a second guide below said crosshead, said lower guide being clear of said crosshead, when the crosshead is in correct position, by a distance not exceeding the thickness of said shoes and linings.

TRACY V. BUCKWALTER.